June 3, 1952 P. CEBOLSKI 2,599,232
PIVOTED TIRE BEAD BREAKING TOOL
WITH OPPOSED PRESSURE ELEMENTS
Filed March 21, 1949
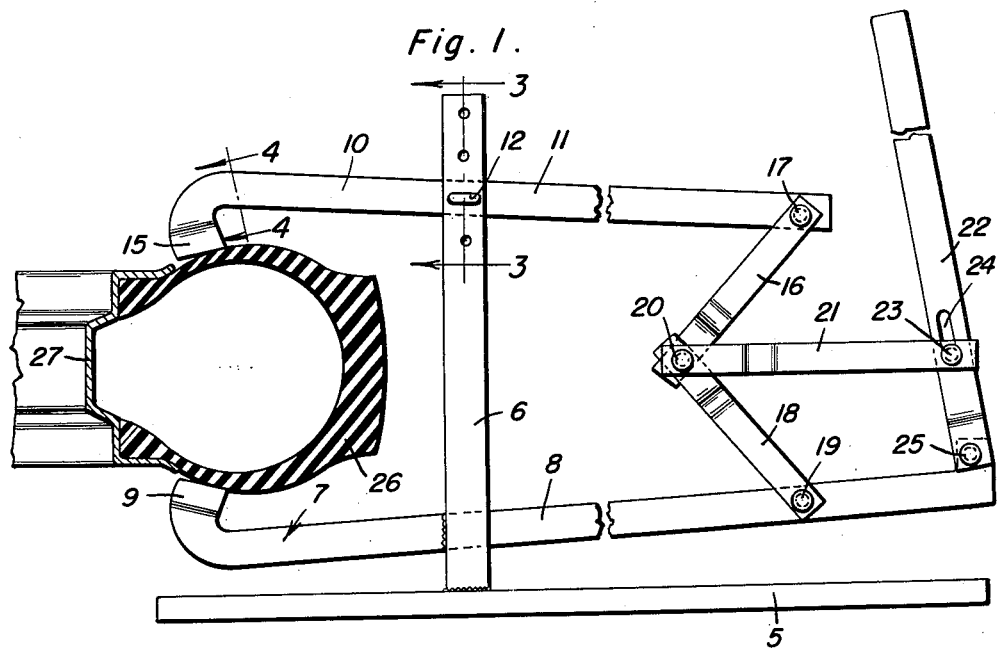
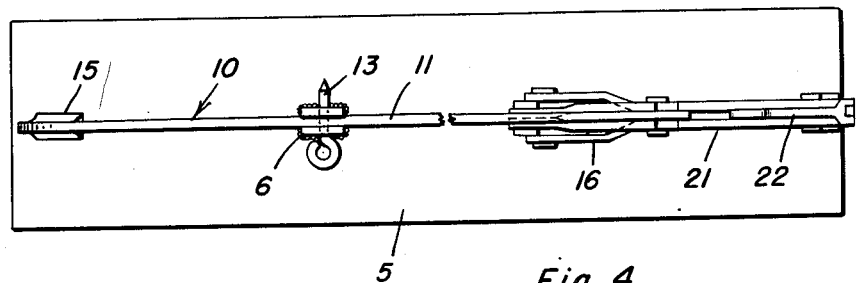
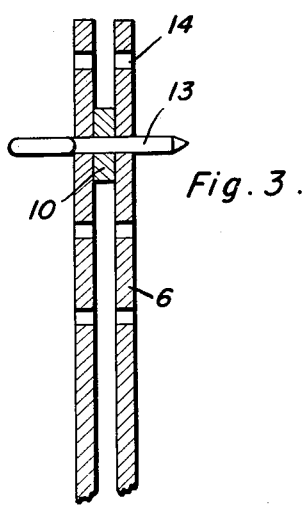
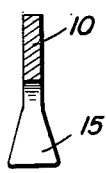
Inventor
Peter Cebolski
By *Clarence A. O'Brien
and Harvey B. Jacobson*
Attorneys Patented June 3, 1952

2,599,232

UNITED STATES PATENT OFFICE 2,599,232

PIVOTED TIRE BEAD BREAKING TOOL WITH OPPOSED PRESSURE ELEMENTS

Peter Cebolski, Belleville, Mich.

Application March 21, 1949, Serial No. 82,544

1 Claim. (Cl. 157—1.28)

The present invention relates to new and useful improvements in tire removing tools to facilitate removal of a tire casing from a rim.

An important object of the invention is to provide a pair of coacting jaws for closing against the opposite side walls of a tire casing to collapse or compress the same for freeing the beading of the tire from the rim.

A further object of the invention is to provide a stand on which the jaws are mounted in position one above the other, one of the jaws being pivoted while the other jaw is stationary and pivotally connecting a lever to the stationary jaw and connecting the same to the movable jaw by linkage to subject the movable jaw to an opening and closing movement.

A still further object is to provide a tool of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view;

Figure 3 is an enlarged vertical sectional view taken on a line 3—3 of Figure 1; and Figure 4 is a transverse sectional view of the movable jaw taken on a line 4—4 of Figure 1.

Referring now to the drawings in detail wherein for the purpose of illustration I have disclosed a preferred embodiment of the invention, the numeral 5 designates a base constructed of a rectangular metal plate with a pair of spaced parallel posts 6 rising therefrom and welded or otherwise suitably secured at their lower ends to the base.

A stationary jaw 7 is constructed of strap metal to provide a shank 8 which is welded or otherwise suitably secured to the lower portion of posts 6, the front end of the jaw projecting forwardly of the posts and formed with an upwardly curved enlarged head 9.

A movable jaw 10 is likewise constructed of strap metal to provide a shank 11 positioned between the upper portion of posts 6 and having a longitudinally extending slot 12 in which a pivot pin 13 is positioned and selectively supported in a vertical row of openings 14 in the posts to vertically adjust the jaw 10 on the posts. The front end of jaw 10 is also formed with a downwardly curved enlarged head 15.

The movable jaw 10 is supported above stationary jaw 7 substantially parallel thereto and a pair of upper links 16 are positioned at opposite sides of the rear end of upper jaw 10 and pivoted thereto by a pin 17 and a pair of lower links 18 are likewise positioned at opposite sides of the lower jaw 7 and pivoted thereto adjacent the rear end of the lower jaw by a pin 19. The links 16 and 17 are inclined forwardly in converging relation with respect to each other and are pivotally connected to each other between the jaws by a pivot pin 20. As will be apparent the pairs of links 16, 18 form toggle jointed levers.

A pair of push and pull rods or links 21 are also pivotally connected at their front ends to the pin 20 and are positioned at opposite sides of a lever 22 and pivotally connected to the lower portion of the lever by means of a pivot pin 23 engaged in a vertical slot 24 in the lever. The lower end of the lever is pivoted to the rear end of stationary jaw 7 by a pivot pin 25.

In the operation of the tool the lower jaw 7 remains stationary and the upper jaw 10 is raised into its open position by a forward movement of lever 22 which pulls the rear end of jaw 10 downwardly by reason of its connection therewith by the links 16, 18 and 21.

A tire casing 26 is positioned between the heads 9 and 15 of the jaws and jaw 10 is closed or lowered by a rearward pulling force on lever 22 which likewise pulls links 16, 18 and 21 rearwardly to raise the rear end of jaw 10 to collapse or compress the side walls of the casing 26 and free the same from a rim 27 on which the casing is mounted.

The upper jaw 10 is vertically adjusted on the posts 6 to accommodate casings of various sizes.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A tire tool comprising a stand having a flat base and a pair of spaced upstanding bars, a pair of co-acting jaws for gripping the opposite side walls of a tire, one of said jaws being fixed between said pair of bars and the other of said jaws being pivoted between said pair of bars above the fixed jaw, a lever pivoted to the rear end of the fixed jaw, links pivoted respectively to the rear ends of the fixed and pivoted jaws and also pivoted to each other, and a link connecting the first named links to the lever for actuating the pivoted jaw in an opening and closing movement, the pivoted jaw having an aperture therein and said bars having horizontally aligned and vertically spaced apertures in the same, and a pin insertable in said aperture in the pivoted jaw and in any of the aligned apertures in the bars to adjust selectively the pivoted jaw toward and away from the fixed jaw.

PETER CEBOLSKI.

REFERENCES CITED

The following references are of record in the file of this patent:

UNITED STATES PATENTS

| Number | Name | Date |
|---|---|---|
| 557,453 | Thompson | Mar. 31, 1896 |
| 1,343,893 | Bjornlie | June 22, 1920 |
| 1,947,607 | Marogg | Feb. 20, 1934 |
| 2,212,768 | Bonneau | Aug. 27, 1940 |
| 2,280,380 | Davenport | Apr. 21, 1942 |
| 2,327,368 | Olson | Aug. 24, 1943 |
| 2,369,362 | Marziani | Feb. 13, 1945 |